United States Patent [19]

Satterfield

[11] 3,731,209

[45] May 1, 1973

[54] PEAK VOLTAGE DETECTOR CIRCUIT

[75] Inventor: Richard Alan Satterfield, Huntington Beach, Calif.

[73] Assignee: Northrop Corporation, Beverly Hills, Calif.

[22] Filed: May 15, 1972

[21] Appl. No.: 253,158

[52] U.S. Cl. ..............................328/151, 307/235 A

[51] Int. Cl. ..............................H03r 5/00

[58] Field of Search ..............................307/227, 235 A; 328/151; 330/140, 141

[56] References Cited

UNITED STATES PATENTS 3,192,481 6/1965 Pincus ..............................328/151

*Primary Examiner*—Roy Lake
*Assistant Examiner*—James B. Mullins
*Attorney*—Edward A. Sokolski et al.

[57] ABSTRACT

A peak voltage detector for detecting the peak of an input voltage and holding this peak value for a predetermined period of time includes a capacitive charging circuit for charging to the peak of the input voltage, a pair of series connected unidirectional electronic valve devices such as diodes connected across the capacitor, and an inverting amplifier, the input of which is connected to receive the voltage on one plate of the capacitor, the output of which is connected to the interconnection point between the electronic valve devices. The peak voltage is held on the capacitor be means of an amplifying feedback circuit provided by the inverting amplifier and the electronic valve devices.

7 Claims, 3 Drawing Figures

PEAK VOLTAGE DETECTOR CIRCUIT

This invention relates to a peak detector circuit, and more particularly to such a circuit capable of detecting the peak of an input signal and holding this peak value for a period of time.

A peak detection hold circuit finds extensive use in analog computer and communications applications. Generally, the object of this type of device is to detect the peak value of a particular signal and then hold the voltage representing this value for subsequent utilization. In the implementation of most peak detector and hold circuits, resistive-capacitive charge circuits are used to develop the peak voltage of the input signal and then some circuit means is provided to prevent this peak voltage from "leaking off" from the capacitor and/or compensating for such leak-off.

The circuit of this invention involves an improvement over prior art peak detector and hold circuits in achieving accurate and reliable operation with substantially less components and simpler circuitry than the prior art. The circuit of this invention thus provides an improvement over the prior art in the way of greater simplicity and economy of fabrication. Also, with less components, less space is required for the circuit of this invention. These factors take on particular significance where a large number of circuits in question are utilized, such that the advantage afforded by the aforementioned factors are multiplied manyfold.

It is therefore an object of this invention to provide an improved peak detector and hold circuit utilizing less components than most such prior art circuits.

It is another object of this invention to simplify and economize the fabrication of peak detector and hold circuits.

It is still a further object of this invention to provide a simple peak detector and hold circuit capable of accurately detecting and holding the peak value of an input signal.

Other objects of this invention will become apparent as the description proceeds in connection with the accompanying drawings, of which:

Briefly described, the circuit of the invention comprises a resistive-capacitive charge circuit to which an input voltage, the peak of which is to be detected and held, is applied. A pair of series connected unidirectional electronic valve devices such as diodes are placed across the capacitor of the charge circuit. The input voltage is applied (through a resistor) to one plate of the capacitor, while the other plate of the capacitor is connected to the input of a high gain inverting amplifier. The output of the amplifier is connected to the common connection between the diode devices. As the capacitor starts to charge, an increasing voltage is provided to the amplifier. The amplifier output reflects this increase in input with a negative going output signal, which is passed through one of the diodes to the input of the amplifier to maintain the input to the amplifier near null by virtue of this negative feedback action. The capacitor thus is permitted to charge towards the peak voltage with one of its plates being maintained at null by virtue of the negative feedback action just described.

When the peak value of the input has been reached and the input voltage falls off, charge starts to flow out of the capacitor. This causes a decrease in the voltage at the plate of the capacitor connector to the input of the amplifier, resulting in an increase in the voltage at the output of the amplifier. This increased voltage results in a current flow through the other of the diodes which is connected to the other plate of the capacitor, thereby preventing any further loss of charge and effectively maintaining the output voltage at the peak value.

Figure 1:
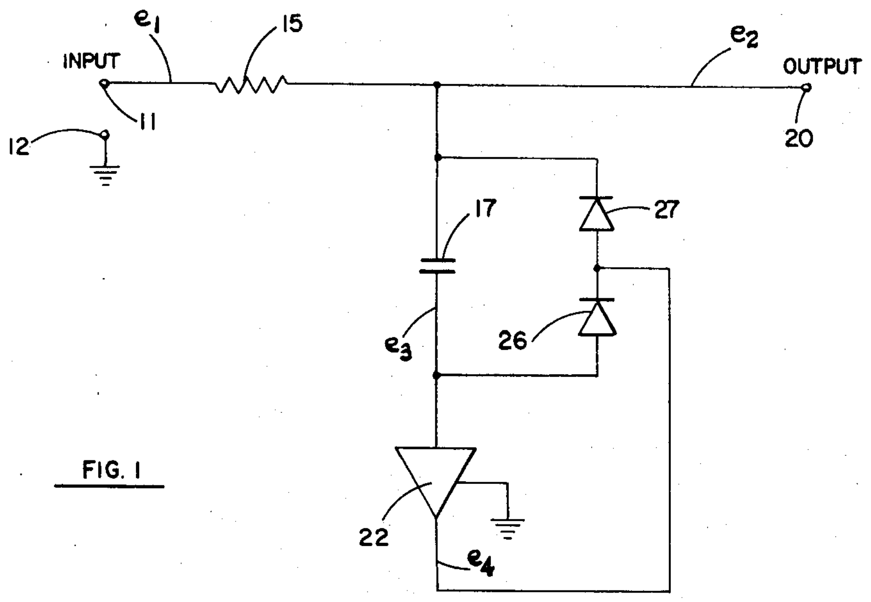
FIG. 1 is a schematic drawing illustrating the basic circuit of the invention.
Figure 2:
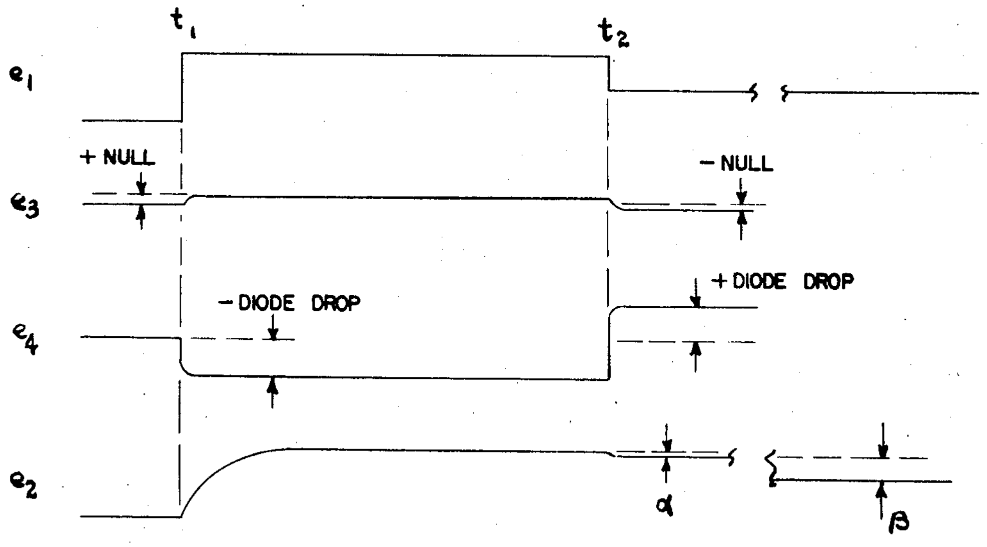
FIG. 2 illustrates a series of wave forms developed in the circuit of the invention.

Referring now to FIGS. 1 and 2, the basic circuit of the invention and waveforms generated therein are respectively illustrated. Input voltage, $e_1$, is applied across input terminals 11 and 12. This signal is applied to the resistive-capacitive charge circuit including resistor 15 and capacitor 17. In response to this signal, capacitor 17 starts to charge to produce the exponentially rising signal $e_2$, shown in FIG. 2, which appears at output terminal 20. One of the plates of capacitor 17 is connected to the input of operational amplifier 22 which is a high gain inverting amplifier. With the start of the exponential increase in the voltage across capacitor 17, voltage $e_3$ applied to the input of amplifier 22 starts to increase (see FIG. 2). This increase in voltage at the input of amplifier 22 causes a corresponding decrease in the output thereof, $e_4$, as shown in FIG. 2. The output, $e_4$ of amplifier 22 is fed to the common connection between series connected diodes 26 and 27. It is to be noted that diodes 26 and 27 may comprise unidirectional electronic valve devices other than diodes and may for example comprise transistors or other semiconductor devices connected to operate in "diode" fashion.

The negative going voltage $e_4$ appearing at the output of amplifier 22 results in a current flow through diode 26, the anode of which is connected to the input of amplifier 22. By virtue of this negative feedback, any incipient increases in voltage $e_3$ are effectively "nulled" out, this voltage being maintained substantially constant except for a small error voltage which maintains the feedback signal. It is to be noted that with amplifier 22 a high gain amplifier, the rise in voltage $e_3$ above the "null" point is very small, it being exaggerated in FIG. 2 for illustrative purposes.

When the input voltage $e_1$ falls from its peak value (at time, $t_2$ in FIG. 2), capacitor 17 starts to discharge, which causes a corresponding drop in voltage $e_3$. This is reflected by an amplified increase in the output, $e_4$, of amplifier 22. The rise in signal $e_4$ causes a current flow through diode 27 to capacitor 17 which maintains the output $e_2$ substantially constant after the input voltage has dropped from its peak value or totally disappeared. The circuit of FIG. 1 is for positive peak detection. It should be apparent that negative peak detection can be achieved by modifying the circuit to reverse the polarities of the diodes.

It is to be noted that the dynamic error "$\alpha$" in the output $e_2$ shown in FIG. 2, is a function of the stored charge in the diodes and response characteristics of the amplifier. This error also varies inversely with the capacitance of capacitor 17. In a typical operating circuit this error is minimal and is grossly exaggerated in FIG. 2 for illustrative purposes. The drift error, "$\beta$," in the output $e_2$ shown in FIG. 2 is due to leakage currents which tend to discharge the capacitor. This error varies inversely with the capacitance of capacitor 17. Normally such leakage is insignificant during the holding time over which the circuit is required to perform.

Figure 3:
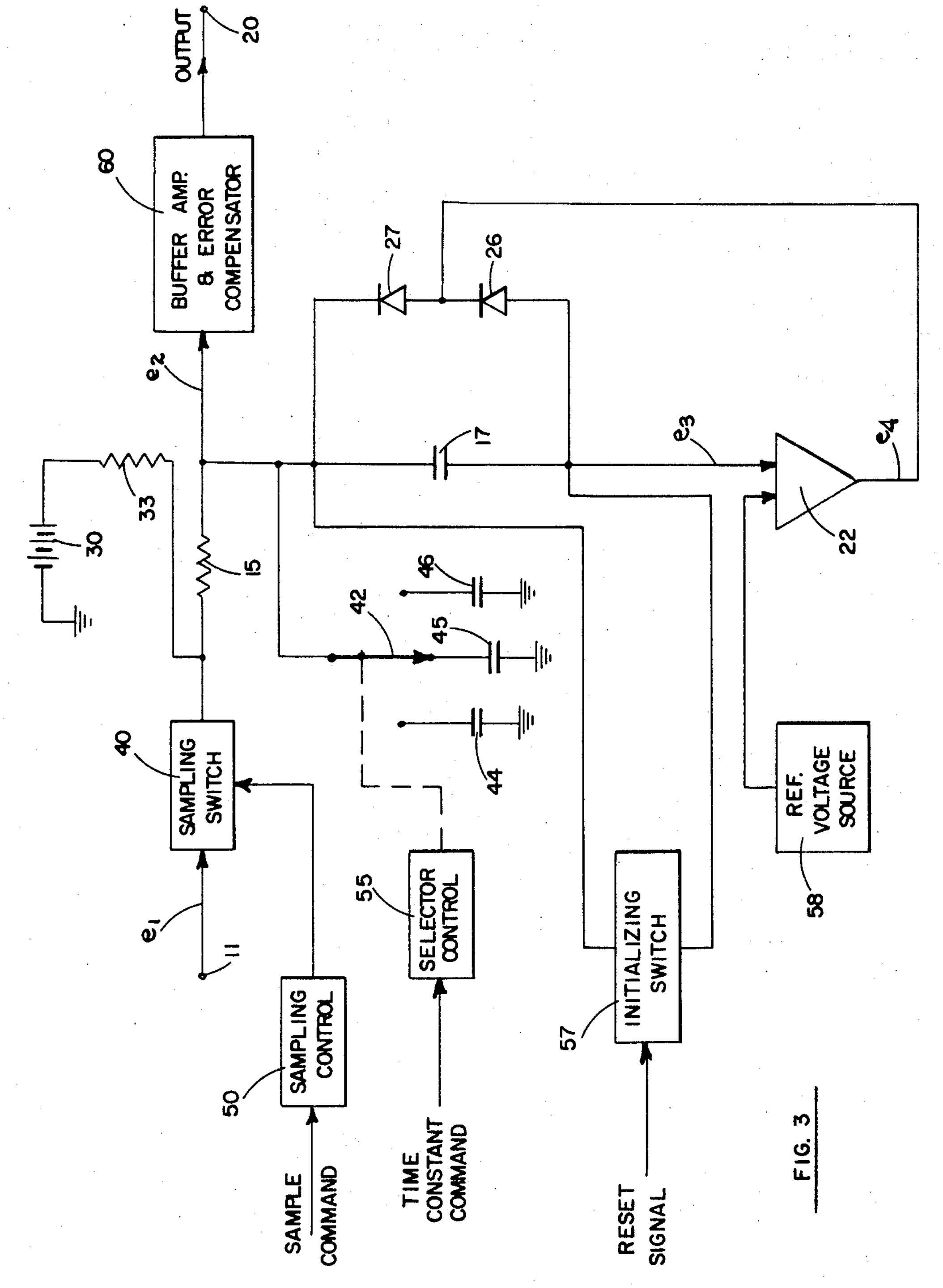
FIG. 3 is a functional schematic illustrating one embodiment of the circuit of the invention.

Referring now to FIG. 3, one embodiment of the circuit of the invention is illustrated. This embodiment utilizes the precise same basic circuit as described in connection with FIG. 1 and will now only be described insofar as newly appearing circuit components are concerned.

The input voltage, $e_1$, is fed through sampling switch 40 to the resistive-capacitive charge circuit which includes resistor 15, capacitor 17 and a capacitor selected by means of selector switch 42 from among capacitors 44–46. The operation of sampling switch 40 is controlled by means of sampling control 50. Typically, sampling switch 40 may comprise a transistor switching circuit with sampling control being a digital circuit which provides an actuation gate to the sampling switch at times when the input signal $e_1$ is to be sampled. Bias voltage for the circuit (when the input is not being sampled) is provided by means of DC power source 30 which is connected directly to resistor 15 through resistor 33. In this manner, synchronous sampling can be achieved in conjunction with associated functions.

Switch 42 is actuated by means of selector control 55 which operates in response to a control signal to select any one of capacitors 44–46. This enables the choice of a desired time constant for the charge circuit for optimum operation as application requirements may dictate. Selector control 55 may comprise a digital circuit which responds to digital control signals to actuate switch 42 which may be an electronic switch rather than a mechanical switching function as illustrated in FIG. 3.

Before each sampling cycle, capacitor 17 must be discharged so that there is no residual charge from the previous sampling. This is achieved by means of initializing switch 57 which provides a short circuit path between the plates of the capacitor in response to a digital control signal.

A reference voltage is provided to amplifier 22 from reference voltage source 58. Amplifier 22 in this instance is a differential amplifier and therefore the input provided thereto from reference voltage source 58 determines the most negative values of the input $e_1$ which can be detected. Thus, for example, if the output of reference voltage source 58 is −5 volts, then the peak detector will detect any value of $e_1$ that is more positive than −5 volts.

The stored signal $e_2$ is fed through buffer amplifier and error compensator 60 to output terminal 20. The buffer amplifier and error compensator isolates the charge circuit from load currents and also provides a corrective signal for $e_2$ to compensate for the error terms "$\alpha$" and "$\beta$" discussed above in connection with FIG. 2.

This invention thus provides a simple yet highly effective circuit for detecting the peak value of a signal and holding this signal for subsequent utilization.

While the invention has been described and illustrated in detail, it is to be clearly understood that this is intended by way of illustration and example only and is not to be taken by way of limitation, the spirit and scope of this invention being limited only by the terms of the following claims.

I claim:

1. A peak detector circuit for detecting the peak value of a signal and holding this signal for a period of time, comprising:

a resistive-capacitive charging circuit including a resistor and a capacitor connected in series, means for feeding said signal to said resistive-capacitive charging circuit to provide a charging current therefor, a pair of series connected unidirectional electronic valve devices, said series connected electronic valve devices being connected across said capacitor, an output terminal connected to the common connection between one of the leads of said capacitor and said electronic valve devices, an inverting amplifier, the input of said amplifier being connected to the common connection between the other of the leads of said capacitor and said electronic valve devices, the output of said amplifier being connected to the common connection between said pair of electronic valve devices, whereby negative feedback is applied to the input of said amplifier through one of said electronic valve devices to maintain a substantially null signal thereat when the input signal is present and a negative feedback signal is applied to said amplifier through the other of said electronic valve devices to the output terminal to maintain said output substantially constant for a period of time after said input signal has disappeared.

2. The circuit of claim 1 wherein said electronic valve devices are diodes.

3. The circuit of claim 2 wherein said circuit is a positive peak detector, the cathode of one of said diodes being connected to the anode of the other of said diodes, the anode of said first mentioned diode being connected to the input of said amplifier, the cathode of the other of said diodes being connected to said output terminal.

4. The circuit of claim 1 and additionally including sampling switch means interposed between the input signal and the charging circuit and sampling control means for controlling the operation of said sampling switch means.

5. The circuit of claim 1 wherein said charging circuit additionally includes a second capacitor and means for selecting said second capacitor from a group of capacitors in response to a command signal.

6. The circuit of claim 4 and additionally including initializing switch means connected across said capacitor, said initializing switch means operating in response to a reset signal to discharge said capacitor prior to the operation of said sampling switch means.

7. The circuit of claim 1 and additionally including buffer amplifier means interposed between said common connector between said one of said capacitor leads and said electronic valve devices and said output terminal to provide isolation for said circuit.

* * * * *